United States Patent
Camenisch et al.

(10) Patent No.: US 10,554,419 B2
(45) Date of Patent: *Feb. 4, 2020

(54) BACKUP AND INVALIDATION OF AUTHENTICATION CREDENTIALS

(71) Applicant: International Business Machines Corporation, Armonk, NY (US)

(72) Inventors: Jan L. Camenisch, Thalwil (CH); Stephan Krenn, Adliswil (CH); Anja Lehmann, Zurich (CH); Gregory Neven, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,365

(22) Filed: Jul. 17, 2017

(65) Prior Publication Data

US 2017/0317839 A1     Nov. 2, 2017

Related U.S. Application Data

(63) Continuation of application No. 14/719,350, filed on May 22, 2015, now Pat. No. 9,755,840.

(30) Foreign Application Priority Data

Jun. 27, 2014  (GB) .................................. 1411510.9

(51) Int. Cl.
  *H04L 9/32*   (2006.01)
  *H04L 9/08*   (2006.01)
  *H04L 29/06*  (2006.01)

(52) U.S. Cl.
  CPC .......... *H04L 9/3268* (2013.01); *H04L 9/0891* (2013.01); *H04L 63/0823* (2013.01); *H04L 9/3218* (2013.01)

(58) Field of Classification Search
  CPC .......................... H04L 9/0891; H04L 9/3218
  See application file for complete search history.

(56) References Cited

U.S. PATENT DOCUMENTS 6,842,523 B1 *  1/2005  Niwa ................... H04L 9/0894
                                              380/278
7,840,806 B2 * 11/2010  Hammond, II ....... H04L 9/0891
                                              713/169

(Continued)

FOREIGN PATENT DOCUMENTS

GB     2527603 A      12/2015
WO   2006116147 A2    11/2006

(Continued)

OTHER PUBLICATIONS

Lysyanskaya, A., Rivest, R.L., Sahai, A. and Wolf, S., Aug. 1999. Pseudonym systems. In International Workshop on Selected Areas in Cryptography (pp. 184-199). Springer, Berlin, Heidelberg. (Year: 1999).*

(Continued)

*Primary Examiner* — James R Turchen
(74) *Attorney, Agent, or Firm* — Dmitry Paskalov

(57) ABSTRACT

A method for a re-issuance of an attribute-based credential of an issuer of the attribute-based credential for a user may be provided. The user is holding backup values derived from a first credential previously obtained from the issuer, wherein the first credential is built using at least a first value of at least one authentication pair. The method comprises receiving by the issuer from the user a set of values derived from the backup values comprising a second value of the at least one authentication pair, validating by the issuer that the second value is a valid authentication answer with respect to the first value and whether the set of values was derived (Continued)

from a valid first credential, and providing by the issuer a second credential to the user based on the first set of values.

20 Claims, 4 Drawing Sheets

(56) References Cited

U.S. PATENT DOCUMENTS

| | | | |
|---|---|---|---|
| 8,533,464 B2 | 9/2013 | Somiotti et al. | |
| 8,990,905 B1* | 3/2015 | Bailey | G06F 21/00 726/5 |
| 9,083,535 B2* | 7/2015 | Mashatan | H04L 63/20 |
| 2001/0032310 A1* | 10/2001 | Corella | H04L 9/002 713/156 |
| 2003/0005118 A1* | 1/2003 | Williams | H04L 63/08 709/225 |
| 2003/0177352 A1* | 9/2003 | Camenisch | H04L 9/3255 713/158 |
| 2005/0289347 A1* | 12/2005 | Ovadia | H04L 9/0877 713/171 |
| 2008/0212783 A1* | 9/2008 | Oba | H04L 9/083 380/279 |
| 2009/0037990 A1* | 2/2009 | Zeng | G06F 21/33 726/6 |
| 2009/0132813 A1* | 5/2009 | Schibuk | G06Q 20/223 713/158 |
| 2010/0268942 A1* | 10/2010 | Hernandez-Ardieta | H04L 9/006 713/156 |
| 2011/0252234 A1 | 10/2011 | De Atley et al. | |
| 2012/0159166 A1* | 6/2012 | Lee | H04L 9/0891 713/168 |
| 2012/0167189 A1* | 6/2012 | Aichroth | H04L 9/006 726/7 |
| 2012/0239936 A1 | 9/2012 | Holtmanns et al. | |
| 2013/0007869 A1* | 1/2013 | Thomas | G06F 21/335 726/9 |
| 2013/0132717 A1* | 5/2013 | Brand | H04L 9/0825 713/156 |
| 2013/0262858 A1 | 10/2013 | Neuman et al. | |
| 2014/0123236 A1* | 5/2014 | Hirata | H04L 63/0807 726/4 |
| 2014/0279556 A1* | 9/2014 | Priebatsch | G06Q 20/322 705/67 |
| 2015/0120569 A1* | 4/2015 | Belshe | G06Q 20/3829 705/71 |
| 2015/0280924 A1* | 10/2015 | Camenisch | H04L 9/3221 713/155 |
| 2015/0381373 A1 | 12/2015 | Camenisch et al. | |

FOREIGN PATENT DOCUMENTS

| | | |
|---|---|---|
| WO | 2011130713 A1 | 10/2011 |
| WO | 2013033612 A1 | 3/2013 |

OTHER PUBLICATIONS

IBM: List of IBM Patents or Patent Applications Treated As Related (Appendix P), Jul. 17, 2017, pp. 1-2.

Hunt et al., OAuth 2.0 Proof-of-Possession (PoP) Security Architecture; P. Hunt et al.; draft-hunt-oauth-pop-architecture-01.txt; Jun. 9, 2014, pp. 1-16.

Bethencourt J, Sahai A, Waters B. Ciphertext-policy attribute-based encryption. In2007 IEEE symposium on security and privacy (SP'07) May 20, 2007 (pp. 321-334). IEEE.

Maji HK, Prabhakaran M, Rosulek M. Attribute-based signatures. InCryptographers' Track at the RSA Conference Feb. 14, 2011 (pp. 376-392). Springer Berlin Heidelberg.

Badarinath Hampiholi, Brinda. "Secure & privacy-preserving eID systems with Attribute-Based Credentials." (2014), pp. 1-99.

Hajny J, Malina L. Unlinkable attribute-based credentials with practical revocation on smart-cards. InInternational Conference on Smart Card Research and Advanced Applications Nov. 28, 2012 (pp. 62-76). Springer Berlin Heidelberg.

Ferraiolo et al., Guidelines for Derived Personal Identity Verification (PIV) Credentials; Hildegard Ferraiolo et al.; NIST Special Publication 800-157; Dec. 2014.

Mashima et al., "User-Centric Handling of Identity Agent Compromise", Georgia Institute of Technology, Atlanta GA 30332, USA, pp. 1-18.

GB Search Report, Reference No. CH920140021GB1, Application No. GB1411510.9, dated Dec. 16, 2014, pp. 1-3.

Camenisch et al., "A Method to Backup and Revoke Authentication Credentials", IBM Research, Oct. 25, 2013, pp. 1-11.

Hajny et al., "Anonymous Credentials with Practical Revocation", 2012 IEEE, pp. 1-6.

* cited by examiner

BACKUP AND INVALIDATION OF AUTHENTICATION CREDENTIALS

BACKGROUND

The invention relates generally to a method for a re-issuance of an attribute-based credential of an issuer of the attribute-based credential for a user. The invention relates further to a re-issuance system for an attribute-based credential of an issuer of the attribute-based credential for a user, a related computing system, a data processing program, and a computer program product.

The more public cloud computing applications and services become available to end users, access to the cloud services via a credential (or credentials) becomes equally essential. In a mobile environment, users often copy authentication credentials to portable devices like smart phones and tablet computers and carry these credentials with them—stored in the mobile device—wherever they go. Although this increases a user's flexibility and convenience, it also implies the risk of losing a credential together with a device. The device might get stolen or may simply be lost. In such a case, it has to be assumed that an adversary gaining access to the device is able to read all information written to the device by the user, even if the device is protected by a PIN or the like. In particular, the credential and all information needed in order to use the credential may be leaked to the adversary. Thus, there are at least two issues that would arise:

Revocation of lost credentials: Users should be able to revoke, or in other words, invalidate credentials, even if the users do not have access to some of the contained attributes, i.e., the mobile device, any longer. This might be the case, if, e.g., a credential was bound specifically to the lost device. On the other hand, no adversary (not controlling the revocation authority) should be able to invalidate a credential on behalf of an honest user, e.g., the original owner.

Backup and Re-Issuance of Credentials: Users should be able to efficiently re-obtain credentials that were lost together with a device. While this could, in theory, be done by going through the entire issuance process again, this might be undesirable in practice, e.g., because of offline authentication steps including appearance in person at a public authority that may be required.

Some documents regarding management of credentials have been published. In document US 2012/0239936 A1, a method and an apparatus are provided for credential transfer from one device to another. The method includes receiving an authorization token at a first device, determining a delegation token, one or more credentials and metadata; and providing—amongst others—the delegation token to a second device.

Document U.S. Pat. No. 8,533,464 B2 discloses a revoking of credentials after they got lost. According to one aspect, a computer-implemented method for a first user to verify an association with a second user through a secret handshake protocol includes maintaining information about a reusable identification handle for the first user wherein the information about the reusable identification handle is provided by a trusted third party.

However, no solution has been provided to handle a re-issuance of lost credentials in a more practicable way. Thus, there is a need for a user-oriented convenient way for a re-issuance of lost credentials.

BRIEF SUMMARY

This need may be addressed by a method for a re-issuance of an attribute-based credential of an issuer of the attribute-based credential for a user, a related re-issuance system, a computing system, a data processing program, and a computer program product, according to the independent claims.

According to an embodiment of one aspect, a method for a re-issuance of an attribute-based credential of an issuer of the attribute-based credential for a user may be provided. The user may be holding backup values derived from a first credential previously obtained from the issuer, wherein the first credential is built using at least a first value of at least one authentication pair. The method may include receiving by the issuer from the user a set of values derived from the backup values including a second value of the at least one authentication pair, and validating by the issuer that the second value is a valid authentication answer with respect to the first value and whether the set of values was derived from a valid first credential. Furthermore, the method may additionally include providing by the issuer a second credential to the user based on the first set of values.

According to an embodiment of another aspect, a re-issuance system for an attribute-based credential of an issuer of the attribute-based credential for a user may be provided. Backup values of the user are derivable from a first credential previously obtained from the issuer; the credential may include a first value of at least one authentication pair. The re-issuance system may include a receiving unit adapted for receiving by the issuer from the user a set of values derived from the backup values including a second value of the at least one authentication pair, and a validating unit adapted for validating by the issuer that the second value is a valid authentication answer with respect to the first value and whether the set of values was derived from a valid first credential, as well as a providing unit adapted for providing by the issuer a second credential to the user based on the set of values.

BRIEF DESCRIPTION OF THE SEVERAL VIEWS OF THE DRAWINGS

Preferred embodiments of the invention will now be described, by way of example only, and with reference to the following drawings.

DETAILED DESCRIPTION

Figure 1:
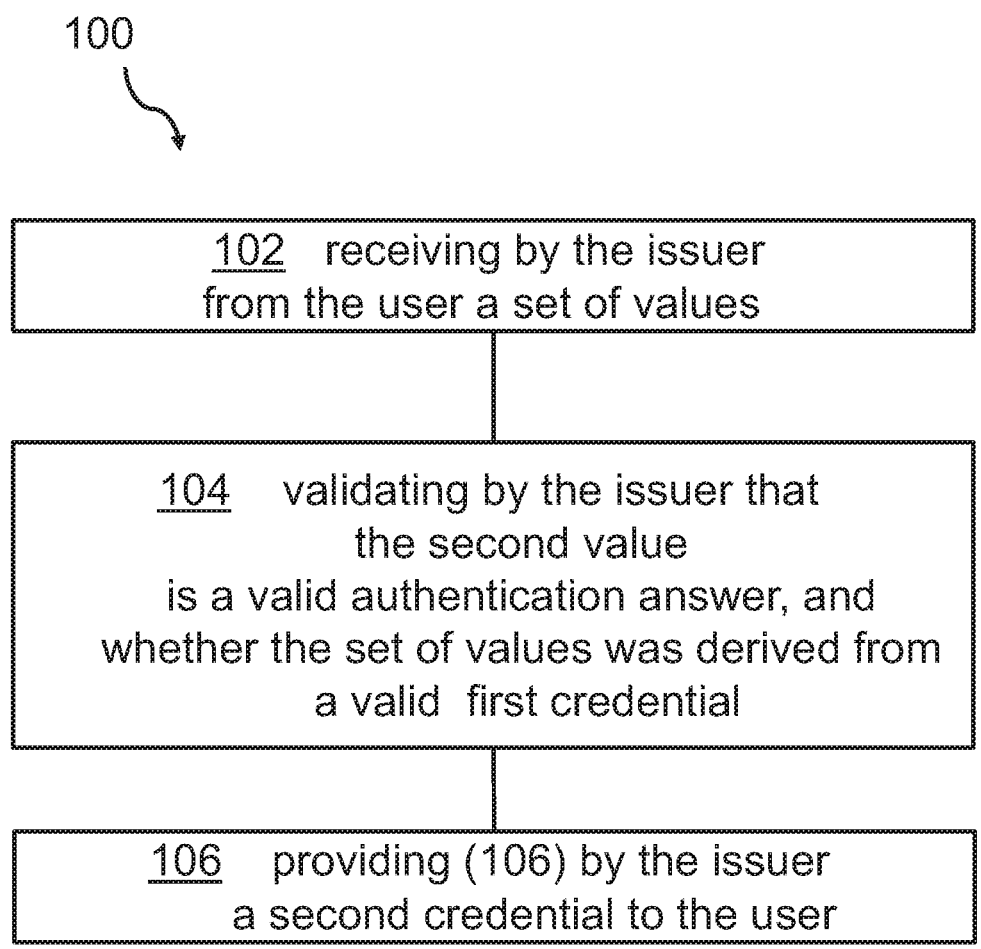
FIG. 1 shows a block diagram of an embodiment of the inventive method for a re-issuance of an attribute-based credential of an issuer of the attribute-based credential for a user, according to an embodiment of the invention.

In the context of this description, the following conventions, terms and/or expressions may be used as follows.

The term "re-issuance", in particular of credentials, may denote a process of providing credentials in a trusted way from an issuer to a user after the credentials have been provided to the user the first time. The credentials may have got lost or otherwise compromised. It may also be the case that the user may wish to transfer everything—all data and applications—from a first mobile device to a second mobile device, wherein credentials have been linked or bound to the first mobile device. Backup values may be used to initiate a re-issuance of a credential, in particular a second credential. The backup values may have to be stored by the user, in particular not on his mobile device but at a different storage location.

The term "authentication pair" may denote a pair of electronic keys of which one may be a public key bpk and the other may be a secret key bsk such that the validity of the key pair may efficiently be checked having both keys, but deriving the secret key from the public key is computationally hard. In particular, the authentication pair may be a key pair for an encryption scheme, or a random string as a secret key and its hash value, e.g., under some cryptographic hash-function such as SHA256, as the public key. Several such authentication pairs may exist, e.g., one pair for an invalidation ($bpk_{inv}$, $bsk_{inv}$) and another pair for a re-issuance ($bpk_{rei}$, $bpk_{rei}$) of a credential. Each pair may include a secret key—$bsk_{inv}$, $bpk_{rei}$—and a public key, i.e., $bpk_{inv}$, $bpk_{rei}$. It is not required to keep both keys simultaneously. Typically, it may be possible to re-generate the public key using the secret key as a basis.

The term "backup values" may denote in this context a set of attributes that may be stored in a private environment of a user, however not on the same mobile device as the credentials. The backup values may be used to prove that the user may have been the rightful owner of the credentials which may be required to be invalidated, i.e., revoked, and new credentials may have to be issued to the user by an issuer. The same backup values may also be used for an invalidation of credentials bound to a first device and new credentials bound to a second device.

The term "invalidation", as well as invalidating may determine a process of declaring active credentials as invented. Access to a service that may be secured by a credential may no longer be possible after invalidating the credential. If the issuer of the credentials and the invalidation authority may be different, typically, the invalidation may be performed by the authentication authority, e.g., a bank or another institution to which electronically accessible services credentials may be required. Throughout this description the term invalidation and revocation are used exchangeable because both expressions are known expression in the technical field of encryption and credential management.

The term "presentation token" may denote a string proving possession of a credential, hiding all attribute values that are not explicitly revealed (in particular, $bpk_{inv}$ and $bpk_{rei}$, respectively, see below).

The term "user" may denote a computer user, and at the same time also a device used by the user. The device may be the mobile device storing the credential.

The term "issuer" may denote an authority and a related computer system issuing credentials to users. In some cases, an authentication or verifier authority may be different to the issuer. The credential may be used to proof to the authentication authority that the user—respectively his device—is the individual owning the credential rightfully. In this context, "issuing a credential" may denote that an issuer may send a credential to a user—respectively to his device—such that the user can proof his identity in front of authentication authorities. In many practical cases, the authentication authorities may be identical to the issuer. Consequently, a "re-issuance" may be a renewed issuance of a second credential after a first credential has been received.

The term "credential" may denote a string certifying attribute values under an issuer's key.

The term "zero knowledge" or "zero knowledge proof" or "prove in zero knowledge" may denote a method by which one party, in particular the individual owning the device, can prove to another party, in particular the verifier or authentication authority that a given statement is true, without conveying any information apart from the fact that the statement is indeed true.

The proposed method for a re-issuance of an attribute-based credential of an issuer of the attribute-based credential for a user may, but need not, offer the following advantages:

In order to realize at least one of the two goals as mentioned in the above background section, a) revocation or invalidation of lost credentials, and b) backup and re-issuance of credentials—require the user to locally store some information that allows him to verifiably convince the invalidation authority (respectively, issuer) that he was the legitimate owner of a potentially lost credential, e.g., a mobile device. As keeping large amounts of data confidential can be a difficult task, the amount of data that must not be vulnerable to an adversary should be kept as low as possible for both goals.

However, if a mobile device on which credentials are stored gets lost, stolen or otherwise compromised, a re-issuance of credentials typically involves an off-line authentication process. For users, this may be quite cumbersome. The proposed solution not only allows—using their backup information—to authentically revoke their credentials but also to re-obtain new credentials such that the new credential is potentially again bound to a specific device. An adversary having access to the old device but not to the secret backup information cannot revoke or re-obtain credentials of honest users. This way, no off-line authentication process involving a physical appearance of a person at the place of the issuer of new credentials is required. Such an enhanced re-issuance and revocation or invalidation process will make the usage of mobile devices having stored credentials on them more secure and more convenient for users.

It may also be noted that for a re-issuance only the attributes that are to be carried over, e.g., to a new device, may be needed. Thus, the proposed method may in particular be useful in case when the credential certifies—among others—a device internal secret key that may not be extracted.

Moreover, an issuer for the first credential and an issuer of a re-issued credential do not need to be the same issuer. They may indeed be different if they work against the same rules and procedures.

According to one embodiment the method may also include invalidating, i.e., revoking, the first credential before the providing a second credential by the issuer is performed. Such an invalidation may not necessarily be performed by the issuer. Also an invalidation authority may invalidate the first credential. Thus, this first credential may no longer be used to identify a user, in particular his device.

According to one embodiment of the method, the backup values may be built using the at least one authentication pair, in particular $bpk_{rei}$, $bpk_{rei}$, and all attributes, e.g., $a_i$, $i \in C$ to be carried over to the second, i.e., re-issued, credential, and determining, i.e., computing, a cryptographic proof of possession of the first credential revealing the first value, in particular $bpk_{rei}$, of the at least one authentication pair. C may be a set of natural numbers comprising indices of the attributes that are to be carried over.

It may be noted that the public part of the authentication pair, i.e., $bpk_{rei}$ may be re-generated based on $bpk_{rei}$. It may be the case that not all attributes $a_i$ of the first credential may be carried over to the second credential. Attributes that should be carried over may include the name of the user, his data of birth and his address. Attributes that may not have to be carried over to the second credential may be the data of issue of the credential, a serial number of the mobile device the credential was linked to, etc.

According to a further embodiment of the method, the backup values may also include a second authentication pair, e.g., with a secret component $bsk_{inv}$ and a public component $bpk_{inv}$, which may also be used to build the first credential, and a presentation token, in particular $\tau_{inv}$, revealing a first value of the second authentication pair, i.e., $bpk_{inv}$, for the first credential. Such a value group may allow an invalidation of the first credential.

Furthermore, according to one embodiment of the method, the determination of the backup values may additionally include determining, i.e., computing a cryptographic commitment, in particular $c_i$ with opening information $o_i$, to each attribute value $a_i$ to be carried over to the second credential, in particular from the first credential, and extending the cryptographic proof that these attribute values to be carried over to the second credential may also have been used to build the first credential.

According to an enhanced embodiment of the method, the second credential may be built from the cryptographic commitments, i.e., $c_i$, $o_i$ of that may be included in the backup values. Thus, $c_i$, $o_i$ of may be used—besides others, e.g., issuer's secret keys—to build the second credential.

According to an additional embodiment of the method, a re-issuance of the presentation token $\tau_{rei}$ may prove that the same first value, in particular $bpk_{inv}$, of the second authentication pair is included in an invalidation commitment, in particular $c_{inv}$, and has been used to build the first credential. This way, a re-issuance of a new credential and an invalidation of the old, i.e. first credential, may be achieved.

According to an additionally enhanced embodiment of the method, upon invalidating the first credential, an invalidation authority may send a digital signature, in particular σ on the first value of the second authentication pair, i.e., $bpk_{inv}$, to the user. The invalidation authority may or may not be the issuer of the credential. The invalidation authority may also be another authentication authority in front of which the first credential was used to prove the identity of the user.

A further feature of the method may include the following: during running a re-issuance protocol—in particular between the issuer and the user—before providing by the issuer a second credential, the user may prove in zero-knowledge that he may own a digital signature, in particular σ under the invalidation authority's key, on the same second value, in particular $bpk_{inv}$, of the second authentication pair that may also be included in the invalidation commitment, i.e., $c_{inv}$.

In another embodiment, the method may additionally include checking by the issuer that the first value of the first authentication pair, i.e. $bpk_{rei}$, has never been used for a re-issuance session before. This may ensure that a user may not run multiple re-issuances for the same first credential.

According to a further embodiment of the method, the invalidation authority of the first credential and the issuer are identical. This may be a typical case. If a bank may be the issuer of a credential for performing bank transactions with this particular bank the same credential may typically not be used for transaction with another bank. The credential may thus be bank specific.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

It should also be noted that embodiments of the invention have been described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

In the following, a detailed description of the figures will be given. All instructions in the figures are schematic. Firstly, a block diagram of an embodiment of the inventive method for a re-issuance of an attribute-based credential of an issuer of the attribute-based credential for a user is given. Afterwards, further embodiments of the method and the related re-issuance system will be described.

Figure 2:
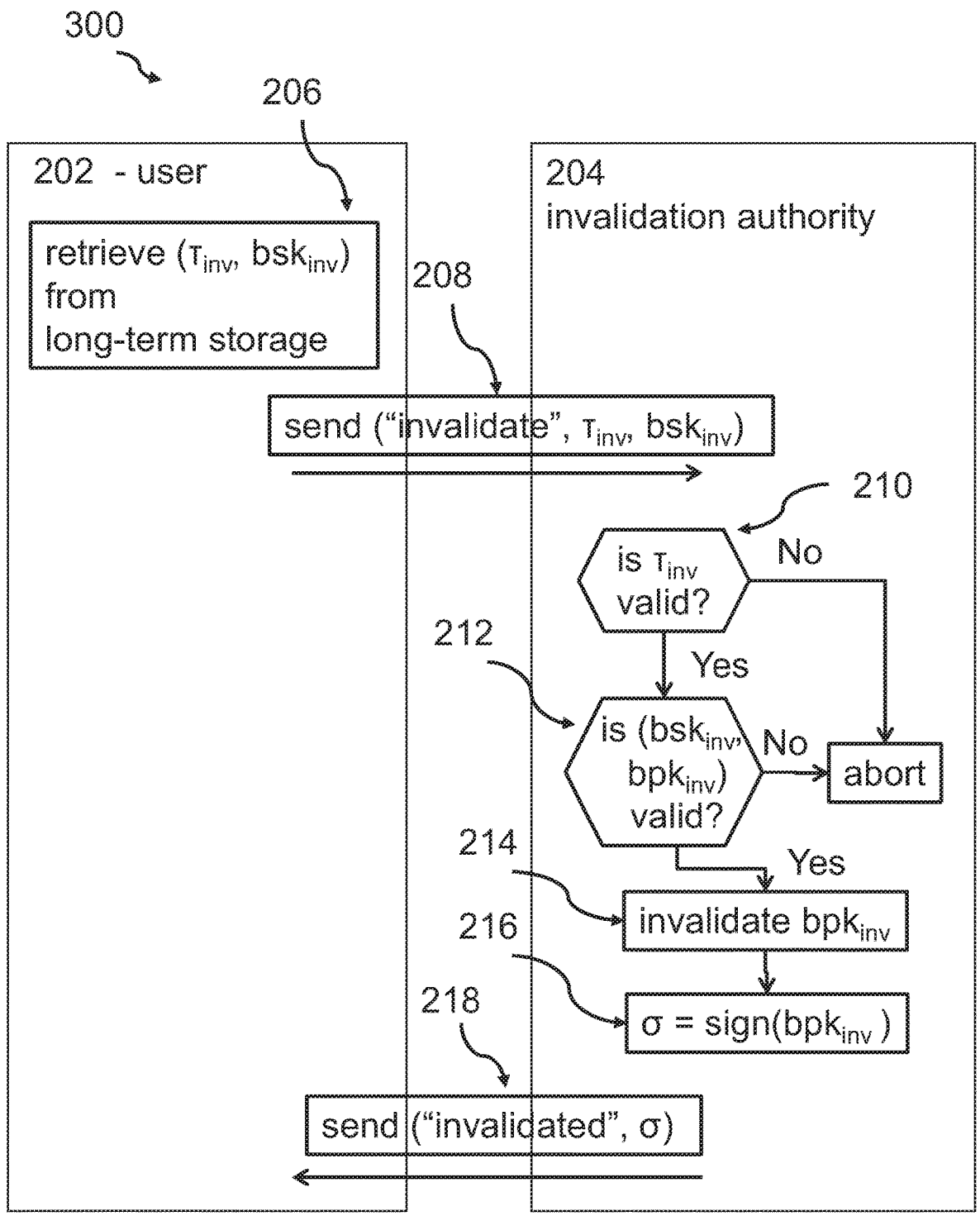
FIG. 2 shows a block diagram of a method, according to an embodiment of the invention.

FIG. 1 shows a block diagram 100 of an embodiment of the inventive method for a re-issuance of an attribute-based credential of an issuer 304 of the attribute-based credential for a user 202 (FIG. 2). Again, the user 202 may hold backup values derived from a first credential previously obtained from the issuer 304, wherein the first credential is built using at least a first value of at least one authentication pair, as described above: $bpk_{rei}$, $bpk_{rei}$. The expression "the first credential is built using at least a first value" may also denote that "the first credential certifies at least a first value".

The method includes several steps: receiving, 102, by the issuer 304 (FIG. 3) from the user 202 a set of values derived from the backup values comprising a second value, in particular $bpk_{rei}$, of the at least one authentication pair. The backup values may alternatively be sent unchanged instead of deriving them from a base set of backup values.

Another step includes validating, 104, by the issuer 304 that the second value, in particular $bpk_{rei}$, is a valid authentication answer with respect to the first value, i.e. $bpk_{rei}$, and whether the set of values was derived from a valid first credential, and a further step may be providing, 106, by the issuer 304 a second credential to the user 202 based on the first set of values.

Thus, the user 202 may have received a new or second credential without performing an offline authentication process, as it is normally required.

Figure 3:
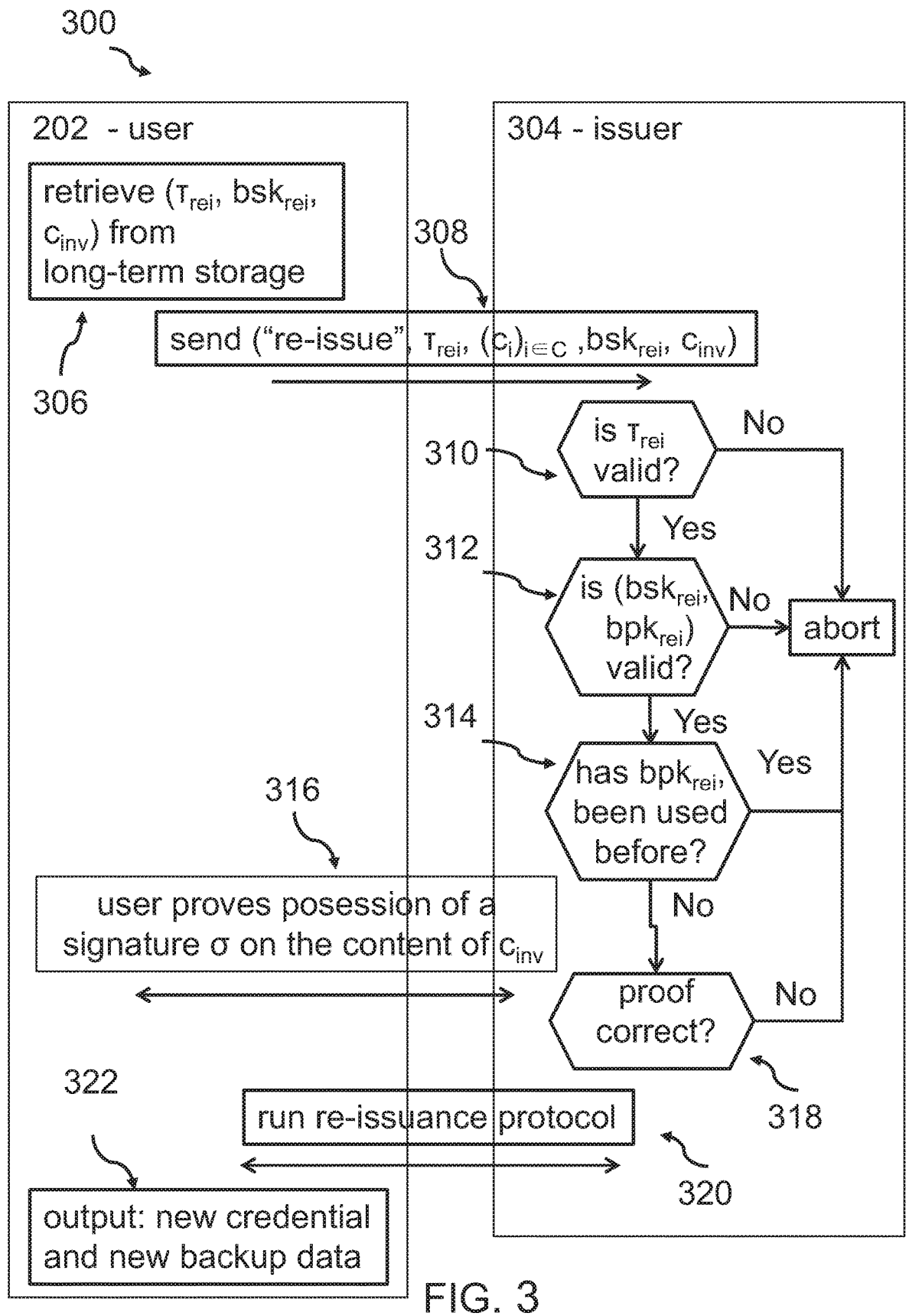
FIG. 3 shows a block diagram of a re-issuance of a second credential in combination with an invalidation according to FIG. 2, according to an embodiment of the invention.

Given this high level view, some more background information should be considered before coming back to the block diagrams of FIG. 2 and FIG. 3.

Firstly, it will be explained how a credential scheme may be adapted to allow one to securely and authentically invalidate and restore credentials after potentially having lost access to some of the contained attributes. In the following, it will be implicitly assumed that a party immediately aborts a protocol, if any of the performed checks fail.

Credential Issuance: Before obtaining a credential for attributes à, the user 202 may generate two secret key/public key authentication pairs: ($bsk_{inv}$; $bpk_{inv}$) and ($bpk_{rei}$; $bpk_{rei}$) for invalidation and re-issuance, respectively. That is, the public keys $bpk_{inv}$ and $bpk_{rei}$ can be computed efficiently given $bsk_{inv}$ and $bpk_{rei}$, but it is computationally infeasible to derive the secret keys $bsk_{inv}$ and $bpk_{rei}$ given only $bpk_{inv}$ and $bpk_{rei}$. The first key pair will be used for invalidation and the second key pair will be used for re-issuance in the following. For simplicity, we assume that $bpk_{inv}$ and $bpk_{rei}$ lies in the attribute space of the credential scheme, otherwise it must first be mapped into this set. The credential is now issued to a=(a'; $bpk_{inv}$; $bpk_{rei}$), where $bpk_{inv}$ and $bpk_{rei}$ are treated as hidden attributes, i.e., their values are not disclosed to the credential issuer 304.

Credential Presentation: For the proposed construction, upon presentation of a credential, $bpk_{inv}$ and $bpk_{rei}$ are always treated as unrevealed attributes. That is, knowledge of these attributes is proved without disclosing their values to verifier. Note that the corresponding secret keys are not required by the user 202 at presentation time and thus need not be stored on a portable device. Furthermore, it is always proved that $bpk_{inv}$ has not yet been revoked, using existing revocation techniques.

Credential Backup: The backup data required for a future re-issuance consists of the following components:

The two authentication pairs ($bsk_{inv}$; $bpk_{inv}$) and ($bpk_{rei}$; $bpk_{rei}$), the credential cred and all attributes $(a_i) i \in C$ to be carried over, commitments $c_i$ and according opening information $o_i$ to all attributes that are to be carried over, i.e., ($c_i$; $o_i$)=Commit($a_i$) for i∈C, a presentation token $\tau_{inv}$ revealing $bpk_{inv}$ for cred, and a presentation token $\tau_{rei}$ revealing $bpk_{rei}$ for cred that simultaneously proves that the $c_i$ contain the same attributes as cred.

Credential Invalidation: Invalidating a credential can be done as follows, even if access to the device carrying the credential is no longer possible:

the legitimate user 202 sends the representation token $T_{inv}$ to the invalidation authority, which verifies the token, and proves possession of the secret key $bsk_{inv}$ corresponding to $bpk_{inv}$, potentially by revealing its value.

the invalidation authority invalidates $bpk_{inv}$.

Credential Re-Issuance: If a user 202 wants to obtain a new credential on attribute values that coincide with those from the first credential for all indices in C:

the user 202 first sends the representation token $\tau_{rei}$ and ($c_i$)i∈C to the issuer 304, who checks that the presentation token is correct, and proves possession of the secret key $bpk_{rei}$ corresponding to $bpk_{rei}$, potentially by revealing its value.

Finally, user 202 and issuer 304 run the issuance protocol, where none of the carry-over attributes need to be revealed to the issuer 304. Depending on the issuer's 304 policy the set of the revealed attributes might be non-empty, to allow the issuer 304, e.g., to check that the user 202 sets a new expiration date correctly.

As stated above, an issuer 304 might only re-issue a new or second credential after the old or first credential has been revoked. This can be achieved by the following modification of the basic scheme.

The backup data may additionally contain a commitment $c_{inv}$ to $bpk_{inv}$.

The re-issuance presentation token $\tau_{rei}$ additionally proves that the same $bpk_{inv}$ is contained in $c_{inv}$ and in the credential. Again, "contained" may denote "is being built using".

Upon invalidation, the invalidation authority may send a digital signature σ on $bpk_{inv}$ to the user 202.

Before running the issuance protocol during re-issuance, the user 202 may additionally prove in zero-knowledge that he possesses a digital signature σ (under the invalidation authority's key) on the same value $bpk_{inv}$ that is also contained in $c_{inv}$. Furthermore, the issuer 304 may check that $bpk_{rei}$ has never been used for a re-issuance session before.

In a block diagram, the invalidation procedure may look as described in the context of FIG. 2.

FIG. 2 is a block diagram 200 of part embodiment of the inventive method. The user 202 may require to invalidate his first credential because his mobile device got lost, was stolen or otherwise compromised. He may retrieve, 206, from a backup storage backup values the representation token $\tau_{inv}$ and $bsk_{inv}$. He may send, 208, those values together with a request to invalidate his current first credential to an invalidation authority 204. In practical cases this may also be the issuer 304 (see FIG. 3, 304).

In the invalidation authority side it may be determined, 210, whether the representation token $\tau_{inv}$ may be valid. Then it may be determined, 212, whether $bsk_{inv}$ in light of $bpk_{inv}$ is valid. If in either determination steps 210 or 212 the answer is "no", then the process may be aborted and the first credential may not be invalidated. If in both determination steps 210 or 212 the answer is "yes", then $bpk_{inv}$ may be invalidated, 214, and a signature σ for $bpk_{inv}$ may be generated, 216, and may be sent back, 218, together with the flag "invalidated" to the user 202, respectively his device.

This way, the first credential has been invalidated by the invalidation authority.

The user 202 may optionally minimize the amount of data to be kept secret: As mentioned earlier, the amount of data to be stored securely by the user 202 should be as small as possible. Thus, this sensitive data may solely consist of $bsk_{inv}$ and $bpk_{rei}$. In particular, the rest of the backup data could be stored in the cloud even without being encrypted to enable the backup procedure to work (however, this is not recommendable, as this would leak potentially personal data contained in the attributes).

The amount of data to be kept private can be reduced to a single master encryption key usk, independent of the number of credentials, if the user 202 stores the bsk's encrypted under usk, i.e., the user 202 may store $ENC_{usk}$($bsk_{inv}$), and $ENC_{usk}$($bpk_{rei}$), and potentially encryptions of all other backup data to avoid the aforementioned data leakage for every credential, and decrypts them upon revocation and re-issuance. Here, ENC may be an arbitrary (symmetric or asymmetric) secure encryption scheme.

The user 202 has now invalidated his existing credential. However, he may also need a new, second credential. This is described in FIG. 3.

In an embodiment, in which the issuer 304 and the invalidation authority 202 are the same entity, and the issuer 304 may only be willing to re-issue a credential after the old one, i.e., first credential, was invalidated, all parts related to $bpk_{inv}$ may be disregarded in the construction of the credential and $bpk_{rei}$ may directly be used as revocation handle as well. Additionally, $c_{inv}$ may not be required in this case, FIG. 3 details such a scenario.

FIG. 3 shows an embodiment 300 of a process flow in which firstly an invalidation of the first credential is performed and afterwards a re-issuance of a credential, i.e., a second credential is performed.

Firstly, the user 202 may retrieve, 306, the representation token $\tau_{rei}$, $bpk_{rei}$, $c_{inv}$ from a long-term storage. He may send, 308, to the issuer 304 a request "re-issue", the representation token $\tau_{rei}$, $(c_i) i \in C$, $bpk_{rei}$, and $c_{inv}$.

On the issuer 304 side, it may be checked, 310, whether the representation token $\tau_{rei}$ may be valid. Then, it is checked, 312, whether $bpk_{rei}$ and $bpk_{rei}$ are valid. In a third step, it may be checked, 314, whether $bpk_{rei}$ has been used before. In case of a "yes" in check 314 and in case of "no" for the first two checks 310, 312, the procedure may be aborted on the issuer 304 side.

If all checks are passed, the user 202 may prove possession of a signature σ on the content of $c_{inv}$ in a communication process 316 with the user 202. Then it may be checked, 318, by the issuer 304, whether the proof was correct. In case of "no" the procedure may be aborted. In case of "yes", a re-issuance protocol, 320, may be performed, as discussed in the context of FIG. 2. As a result 322, the user 202 may have a new, i.e., second, credential on his new device and new backup data, just the same as discussed in the context of FIG. 2.

Figure 4:
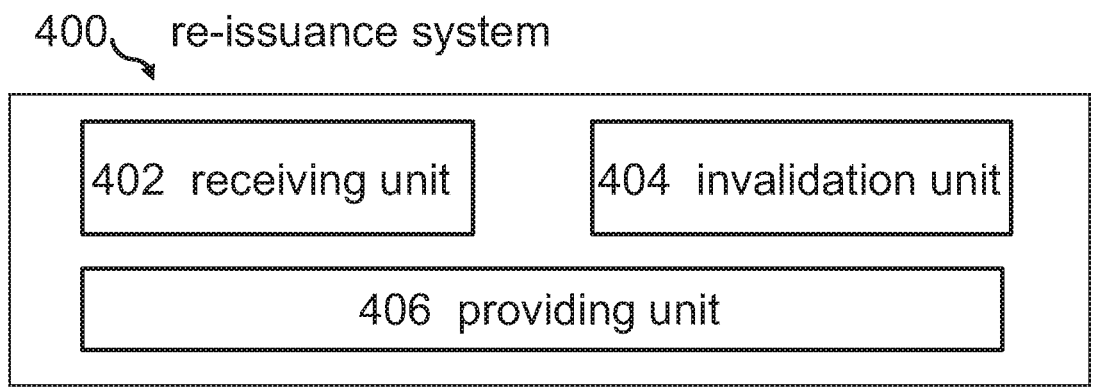
FIG. 4 shows an embodiment of a re-issuance system.

FIG. 4 shows a block diagram of the re-issuance system 400 for an attribute-based credential of an issuer 304 of the attribute-based credential for a user 202, wherein backup values of the user 202 are derivable from a first credential previously obtained from the issuer 304 wherein the credential includes a first value of at least one authentication pair. The re-issuance system 400 may include a receiving unit 402 adapted for receiving by the issuer 304 from the user 202 a set of values derived from the backup values comprising a second value of the at least one authentication pair, a validating unit 404 adapted for validating by the issuer 304 that the second value is a valid authentication answer with respect to the first value and whether the set of values was derived from a valid first credential, and a providing unit 406 adapted for providing by the issuer 304 a second credential to the user 202 based on the set of values.

Figure 5:
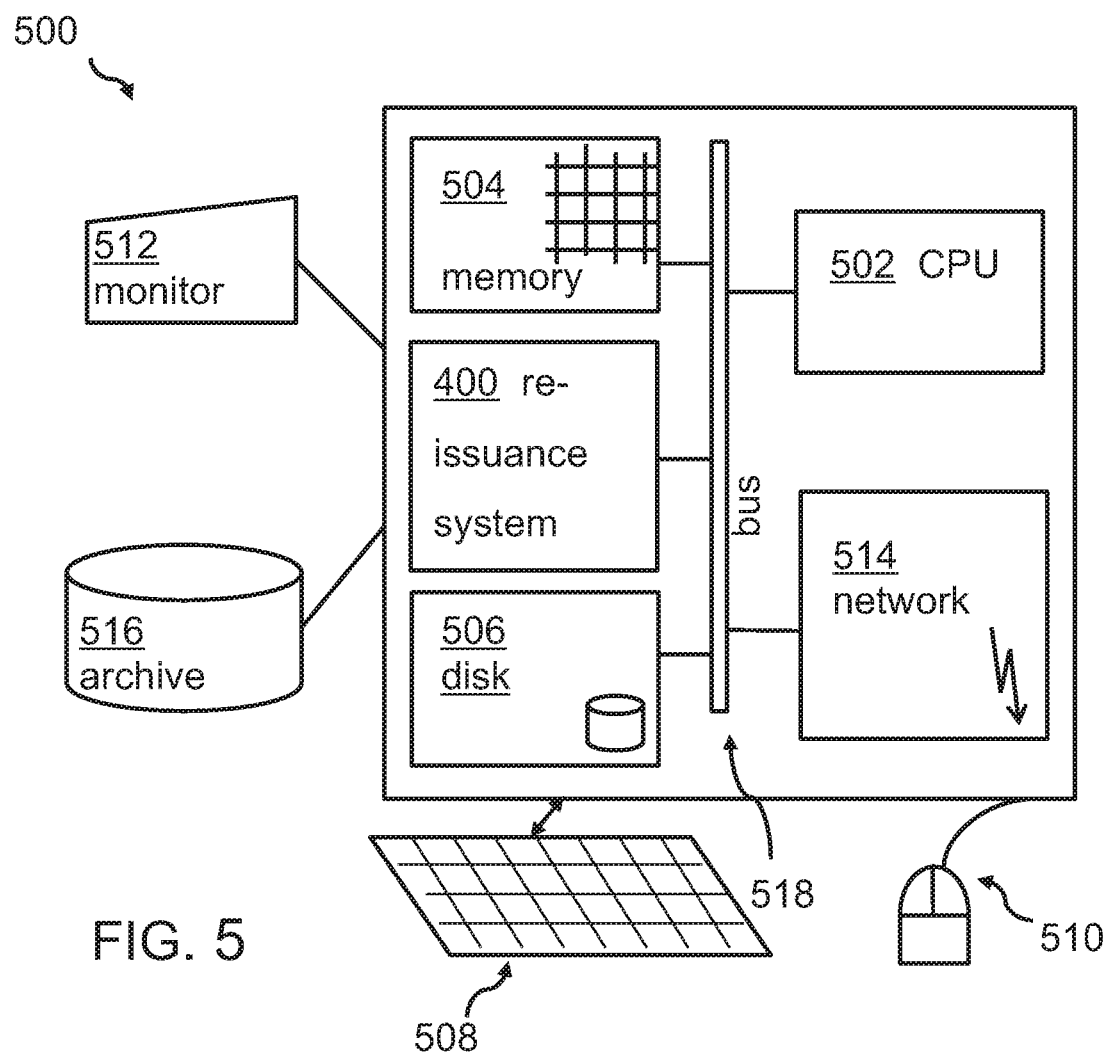
FIG. 5 shows an embodiment of a computing system including the re-issuance system according to FIG. 4, according to an embodiment of the invention.

Embodiments of the invention may be implemented together with virtually any type of computer, regardless of the platform being suitable for storing and/or executing program code. Typically, the mobile device may be tablet computer, a smart phone or a notebook computer. Other form factors may be possible. The issuer 304, invalidation authority 202 and/or the authentication authority may also be represented by a computer having comparable features, although these systems may typically be server systems. For example, as shown in FIG. 5, a computing system 500 may include one or more processor(s) 502 with one or more cores per processor, associated memory elements 504, an internal storage device 506 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 504 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 516 for an execution. Elements inside the computer 500 may be linked together by means of a bus system 518 with corresponding adapters. Additionally, components of the re-issuance system 400 for an attribute-based credential of an issuer 304 of the attribute-based credential for a user may be attached to the bus system 518.

The computing system 500 may also include input means such as a keyboard 508, a pointing device such as a mouse 510, or a microphone (not shown). Alternatively, the computing system may be equipped with a touch sensitive screen as main input device. Furthermore, the computer 500, may include output means such as a monitor or screen 512 [e.g., a liquid crystal display (LCD), a plasma display, a light emitting diode display (LED), or cathode ray tube (CRT) monitor]. The computer system 500 may be connected to a network [e.g., a local area network (LAN), a wide area network (WAN)], such as the Internet or any other similar type of network, including wireless networks via a network interface connection 514. This may allow a coupling to other computer systems, or a storage network, or a tape drive. Those, skilled in the art will appreciate that many different types of computer systems exist, and the aforementioned input and output means may take other forms. Generally speaking, the computer system 500 may include at least the minimal processing, input and/or output means, necessary to practice embodiments of the invention.

While the invention has been described with respect to a limited number of embodiments, those skilled in the art, having benefit of this disclosure, will appreciate that other embodiments may be devised, which do not depart from the scope of the invention, as disclosed herein. Also, elements described in association with different embodiments may be combined. It should also be noted that reference signs in the claims should not be construed as limiting elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for a re-issuance of an attribute-based credential of an issuer of the attribute-based credential for a user, wherein the user stores backup values in a private environment separated from the attribute-based credential of the user, wherein the backup values are derivable from a first credential previously obtained from the issuer and not disclosed to the issuer, wherein the first credential is built using at least a first value of at least one authentication pair, the method comprising:
   receiving, by the issuer from the user, a set of values from the backup values comprising a second value of the at least one authentication pair; and
   based on validating, by the issuer, that the second value is a valid authentication answer with respect to the first value and whether the set of values was derived from a valid first credential:
     invalidating, by the issuer, the first credential; and
     based on invalidating the first credential providing, by the issuer, a second credential to the user, wherein the second credential is based on the set of values.

2. The method according to claim 1, further comprising: invalidating the first credential before the providing by the issuer a second credential is performed.

3. The method according to claim 1, wherein the backup values are built using the at least one authentication pair and attributes to be carried over to the second credential, and the method further comprises:
   determining a cryptographic proof of possession of the first credential revealing the first value of the at least one authentication pair.

4. The method according to claim 3, wherein the backup values also comprise a second authentication pair, which is also used to build the first credential, and a presentation token revealing a first value of the second authentication pair for the first credential.

5. The method according to claim 3, wherein the determination of the backup values further comprises:
   determining a cryptographic commitment to each attribute value to be carried over to the second credential; and
   extending the cryptographic proof that these attribute values to be carried over to the second credential have also been used to build the first credential.

6. The method according to claim 1, wherein the second credential is built from the cryptographic commitments that is comprised in the backup values.

7. The method according to claim 1, wherein a re-issuance of the presentation token proves that the same first value of a second authentication pair is comprised in the invalidation commitment and has been used to build the first credential.

8. The method according to claim 1, wherein upon invalidating the first credential an invalidation authority sends a digital signature on the first value of the second authentication pair to the user.

9. The method according to claim 1, further comprising:
   during running a re-issuance protocol and before providing by the issuer a second credential, receiving from the user proof in zero-knowledge that the user owns a digital signature on the same second value of the second authentication pair that is also comprised in the invalidation commitment.

10. The method according to claim 9, further comprising:
    checking by the issuer that first value of the first authentication pair has never been used for a re-issuance session before.

11. The method according to claim 1, wherein an invalidation authority of the first credential and the issuer are identical.

12. A re-issuance system for an attribute-based credential of an issuer of the attribute-based credential for a user, wherein the user stores backup values in a private environment separated from the attribute-based credential of the user, wherein the backup values derivable from a first credential previously obtained from the issuer and not disclosed to the issuer, wherein the credential comprises a first value of at least one authentication pair, the re-issuance system comprising:
    a computer device having a processor and a tangible storage device; and
    a program embodied on the storage device for execution by the processor, the program having a plurality of program instructions to:
        receive, by the issuer from the user, a set of values derived from the backup values comprising a second value of the at least one authentication pair; and
        based on validating, by the issuer, that the second value is a valid authentication answer with respect to the first value and whether the set of values was derived from a valid first credential:
            invalidate, by the issuer, the first credential; and
            based on invalidation of the first credential provide, by the issuer, a second credential to the user, wherein the second credential is based on the set of values.

13. The system according to claim 12, wherein the program instructions further comprise instructions to:
    invalidate the first credential before the providing by the issuer a second credential is performed.

14. The system according to claim 12, wherein the backup values are built using the at least one authentication pair and attributes to be carried over to the second credential, and the program instructions further comprise instructions to:
    determine a cryptographic proof of possession of the first credential revealing the first value of the at least one authentication pair.

15. The system according to claim 12, wherein the backup values also comprise a second authentication pair, which is also used to build the first credential, and a presentation token revealing a first value of the second authentication pair for the first credential.

16. A computer program product for a re-issuance of an attribute-based credential of an issuer of the attribute-based credential for a user, wherein the user stores backup values in a private environment separated from the attribute-based credential of the user, wherein the backup values derivable from a first credential previously obtained from the issuer and not disclosed to the issuer, wherein the credential comprises a first value of at least one authentication pair, the computer program product comprising a tangible storage device having program code embodied therewith, the program code executable by a processor of a computer to perform a method, the method comprising:
    receiving, by the issuer from the user, a set of values from the backup values comprising a second value of the at least one authentication pair;
    based on validating, by the issuer, that the second value is a valid authentication answer with respect to the first value and whether the set of values was derived from a valid first credential:
        invalidating, by the issuer, the first credential; and
        based on invalidating the first credential providing, by the issuer, a second credential to the user, wherein the second credential is based on the set of values.

17. The computer program product according to claim 16, wherein the method further comprises:
    invalidating, by the issuer, the first credential before the providing by the issuer a second credential is performed.

18. The computer program product according to claim 16, wherein the backup values are built using the at least one authentication pair and attributes to be carried over to the second credential, and the method further comprises:
    determining, by the issuer, a cryptographic proof of possession of the first credential revealing the first value of the at least one authentication pair.

19. The computer program product according to claim 16, wherein the backup values also comprise a second authentication pair, which is also used to build the first credential, and a presentation token revealing a first value of the second authentication pair for the first credential.

20. The computer program product according to claim 18, wherein the determination of the backup values further comprises:
    determining, by the issuer, a cryptographic commitment to each attribute value to be carried over to the second credential; and
    extending, by the issuer, the cryptographic proof that these attribute values to be carried over to the second credential have also been used to build the first credential.

* * * * *